(12) United States Patent
Hirotani et al.

(10) Patent No.: US 12,506,373 B2
(45) Date of Patent: Dec. 23, 2025

(54) ELECTRIC ROTATING MACHINE AND ELECTRIC POWER STEERING APPARATUS

(71) Applicant: Mitsubishi Electric Corporation, Tokyo (JP)

(72) Inventors: Yu Hirotani, Tokyo (JP); Kenta Motoyoshi, Tokyo (JP); Hiroko Ikeda, Tokyo (JP); Shohei Fujikura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 237 days.

(21) Appl. No.: 18/030,825

(22) PCT Filed: Oct. 27, 2020

(86) PCT No.: PCT/JP2020/040201
§ 371 (c)(1),
(2) Date: Apr. 7, 2023

(87) PCT Pub. No.: WO2022/091198
PCT Pub. Date: May 5, 2022

(65) Prior Publication Data
US 2023/0378832 A1   Nov. 23, 2023

(51) Int. Cl.
 *H02K 1/278* (2022.01)
 *H02K 1/02* (2006.01)
 *H02K 16/02* (2006.01)

(52) U.S. Cl.
 CPC .............. *H02K 1/278* (2013.01); *H02K 1/02* (2013.01); *H02K 16/02* (2013.01); *H02K 2201/03* (2013.01); *H02K 2213/03* (2013.01)

(58) Field of Classification Search
 CPC .......... H02K 1/278; H02K 1/02; H02K 16/02; H02K 2201/03; H02K 2213/03;
 (Continued)

(56) References Cited

U.S. PATENT DOCUMENTS 6,940,205 B1   9/2005  Murakami et al.
2004/0124728 A1   7/2004  Yamaguchi et al.
(Continued)

FOREIGN PATENT DOCUMENTS

CN   110915106 A   3/2020
EP   2 192 670 A1   6/2010
(Continued)

OTHER PUBLICATIONS

Machine Translation of JP_2003284276_A (Year: 2003).*
(Continued)

*Primary Examiner* — Alexander A Singh
*Assistant Examiner* — Charlie Frank Mann, Jr.
(74) *Attorney, Agent, or Firm* — Sughrue Mion, PLLC

(57) ABSTRACT

In an electric rotating machine according to this application, a maximum height of a permanent magnet in a rotor and a flange-part root radial thickness of the tooth portion in the stator can be set properly, so that it is possible to eliminate unbalanced magnetic saturation at flange parts of the heads of the tooth portions. This makes it possible to reduce an unbalance between torque ripples that are generated respectively by an upper-side rotor block and a lower-side rotor block when an electric power steering apparatus is driven under static steering conditions, to thereby achieve an electric rotating machine with a suppressed torque ripple. With the use of this electric rotating machine, since the torque-ripple unbalance is reduced, it is possible to achieve an electric power steering apparatus with a suppressed torque ripple.

10 Claims, 12 Drawing Sheets

(58) Field of Classification Search
CPC .. H02K 16/025; H02K 16/04; H02K 2201/06; H02K 2201/15; H02K 2201/00
USPC ................................................. 310/156.47
See application file for complete search history.

(56) References Cited

U.S. PATENT DOCUMENTS

| | | | |
|---|---|---|---|
| 2005/0225194 | A1 | 10/2005 | Murakami et al. |
| 2006/0192456 | A1 | 8/2006 | Yamaguchi et al. |
| 2007/0205687 | A1 | 9/2007 | Murakami et al. |
| 2007/0205688 | A1 | 9/2007 | Murakami et al. |
| 2009/0251023 | A1* | 10/2009 | Nakano ............... H02K 29/03 310/156.38 |
| 2010/0133940 | A1 | 6/2010 | Grossmann et al. |
| 2013/0154436 | A1 | 6/2013 | Nakano et al. |
| 2014/0084741 | A1 | 3/2014 | Iwasaki et al. |
| 2015/0263571 | A1 | 9/2015 | Nakano et al. |
| 2017/0063208 | A1* | 3/2017 | Li ........................ H02K 29/03 |
| 2017/0101996 | A1 | 4/2017 | Zhou et al. |
| 2017/0288517 | A1* | 10/2017 | Ikeno ................... H02K 21/16 |
| 2020/0021151 | A1 | 1/2020 | Shimokawa et al. |
| 2020/0227960 | A1 | 7/2020 | Ohori et al. |
| 2021/0083532 | A1 | 3/2021 | Pyeon et al. |
| 2022/0216744 | A1 | 7/2022 | Pyeon et al. |
| 2023/0216358 | A1 | 7/2023 | Pyeon et al. |

FOREIGN PATENT DOCUMENTS

| | | | | |
|---|---|---|---|---|
| JP | 11-89197 | A | | 3/1999 |
| JP | 2003284276 | A | * | 10/2003 |
| JP | 2004-159492 | A | | 6/2004 |
| JP | 2004-208341 | A | | 7/2004 |
| JP | 2004274963 | A | * | 9/2004 |
| JP | 2007-151233 | A | | 6/2007 |
| JP | 2014-068495 | A | | 4/2014 |
| JP | 2016-63728 | A | | 4/2016 |
| JP | 2017-17913 | A | | 1/2017 |
| JP | 2017-046581 | A | | 3/2017 |
| JP | 2017-085877 | A | | 5/2017 |
| JP | 2019022430 | A | * | 2/2019 ............... H02K 1/27 |
| KR | 10-2019-0023243 | A | | 3/2019 |
| WO | 2012/032591 | A1 | | 3/2012 |
| WO | 2017/104436 | A1 | | 6/2017 |
| WO | 2018/066084 | A1 | | 4/2018 |

OTHER PUBLICATIONS

Machine Translation of JP_2019022430_A (Year: 2019).*
Machine Translation of JP_2004274963_A (Year: 2004).*
International Search Report for PCT/JP2020/040201 dated Dec. 28, 2020.
Extended European Search Report dated Dec. 6, 2023 in Application No. 20959716.0.
Japanese Office Action dated Nov. 28, 2023 in Application No. 2022-558630.
Communication dated May 20, 2025 issued by the State Intellectual Property Office of the P.R.China in application No. 202080106464.4.

* cited by examiner

ELECTRIC ROTATING MACHINE AND ELECTRIC POWER STEERING APPARATUS

This Application is a National Stage of International Application No. PCT/JP2020/040201 filed Oct. 27, 2020.

TECHNICAL FIELD

The present application relates to an electric rotating machine and an electric power steering apparatus.

BACKGROUND ART

Recently, with the progress of reduction in sound of engines and electric rotating machines mounted in automobiles, the demand for further reduction of vehicle interior noise is increasing. Among other things, an electric power steering apparatus that assists a steering force by using an electric rotating machine is required to reduce its operation noise. As one of the factors of the operation noise of the electric power steering apparatus, there is a torque ripple component that is generated when the steering wheel is turned and the electric rotating machine outputs an assist torque. It is cited as a problem that the torque ripple component propagates through an output shaft of the electric rotating machine to the electric power steering apparatus. Accordingly, the electric rotating machine mounted in the electric power steering apparatus is required to reduce the torque ripple.

As an electric rotating machine to be mounted in the electric power steering apparatus, in many cases, such an electric rotating machine is mounted that employs a concentrated winding system for the armature windings of the stator, in terms of productivity and cost. In particular, a permanent magnet-type electric rotating machine is frequently employed whose poles and slots are integer multiple of 2 poles and 3 slots as a basic configuration in the concentrated winding system. However, according to the permanent magnet-type electric rotating machine of this system, since the winding factor for harmonic components that may act on the torque ripple is large, there is a problem that the torque ripple becomes larger.

In particular at the time of performing static steering, the electric rotating machine mounted in the electric power steering apparatus is required to have a large torque corresponding to a road-surface reaction force, so that the armature windings of the electric rotating machine are energized by a current that is larger than that at the time of non-static steering. On this occasion, an average torque generated by the electric rotating machine becomes larger, so that the torque ripple becomes also larger. Accordingly, in order to satisfy the performance of low operation noise that is required for the electric power steering apparatus, it is necessary to reduce the torque ripple of the electric rotating machine under electric-current conditions in the case of performing static steering.

In a vehicle whose noise during driving is small, such as, an EV (Electric Vehicle), an HEV (Hybrid Electric Vehicle) or the like, a smaller operation noise is also required for the electric power steering apparatus at the time of static steering. In order to meet such a requirement for low operation noise, in the torque ripple required for the electric rotating machine, it is preferred that respective order components of the torque ripple be each 1% or less relative to the average torque generated by the electric rotating machine.

In this respect, such a configuration is proposed in which a rotor is divided across the direction of the rotation shaft into two rotor blocks, and they are aligned in the same axis while being mutually shifted angularly in the circumferential direction. Such a technique is proposed in which a circumferential angle is established between an upper-side rotor block and a lower-side rotor block so that the torque ripple components generated in the respective rotor blocks are inverted to each other, to thereby cancel out the torque ripples (for example, Patent Documents 1 and 2).

CITATION LIST

Patent Document

Patent Document 1: International Patent Application Publication No. 2017/104436
Patent Document 2: Japanese Patent Application Laid-open No. 2004-159492

SUMMARY OF INVENTION

Technical Problem

In the electric rotating machine mounted in the electric power steering apparatus, its rotor has a central body whose outer shape in cross-section perpendicular to its shaft center is a regular polygonal shape. Permanent magnets are placed on respective multiple flat portions of the central body corresponding to the respective sides of the regular polygonal shape. The permanent magnet has a cross-section perpendicular to the shaft center whose radially outer side is arc-like and whose radially inner side is linear. The rotor may include two-stage rotor blocks that are each have such a central body and the permanent magnets placed on the flat portions of the central body, that are aligned in the axial direction while being shifted in the circumferential direction from each other by a preset angle, and that are rotatable integrally. Such a structure of the rotor in which the rotor blocks are attached together while being shifted in the circumferential direction from each other by the preset angle, is referred to as a skew structure, and the shifting angle is referred to as a skew angle.

According to the permanent magnet-type electric rotating machine employing the two-stage skew structure as shown in Patent Documents 1 and 2, a phase difference occurs in the rotation direction between the two-stage skew portions of the upper-side rotor block and the lower-side rotor block. Accordingly, with respect to the rotating magnetic field created by the armature windings of the stator, one side of the rotor blocks is provided with a leading phase and the other side thereof is provided with a lagging phase. On this occasion, it is possible to reduce the torque ripples by properly setting the skew angle.

Further, it is possible to reduce the torque ripple by properly setting the shape of the permanent magnet of the rotor.

The stator is provided with: an iron core having an annular portion and multiple tooth portions extending from the annular portion to its radially inner side and circumferentially arranged to be spaced apart from each other; and windings wound around the tooth portions. The tooth portion has, at its head, flange parts circumferentially projecting toward the adjacent tooth portions. A cogging torque is generated due to fluctuation of a magnetic attractive force between the rotor and the teeth of the stator. The fluctuation of the magnetic attractive force occurs due to varying magnetic attractive force at the slot opening between teeth during rotation of the rotor. Thus, the narrower the gap of the slot opening, the smaller the fluctuation of the magnetic attractive force. When the tooth portion has the flange parts at the head, the gap of the slot opening can be narrowed, and thus the cogging torque due to rotation of the rotor can be reduced. Accordingly, because of the flange parts of the tooth portion, it is possible to reduce the operation noise of the electric power steering apparatus provided with the electric rotating machine, and to improve the steering feeling thereof.

Here, in order to further suppress the torque ripple, it is necessary to eliminate unbalanced magnetic saturation at the flange parts of the tooth heads. For that purpose, it is effective if the flange parts opposing the upper-side rotor block and the flange parts opposing the lower-side rotor block are magnetically saturated in a mutually balanced manner under static steering conditions. By using the electric rotating machine in which a relationship between a magnet flux that is determined depending on the thickness of the permanent magnet in the rotor, and a magnetic circuit at the tooth head that is determined depending on the radial thickness at the root of the flange part, is properly defined, it would be possible to suppress the torque ripple.

A problem of this application is how to properly set the thickness of the permanent magnet in the rotor and the radial thickness at the root of the tooth flange part in the stator in order to reduce the torque ripple.

Further, a problem of this application is how to provide an electric power steering apparatus provided with an electric rotating machine in which, just as afore-mentioned, the thickness of the permanent magnet in the rotor and the radial thickness at the root of the tooth flange part in the stator are properly set in order to reduce the torque ripple.

Solution to Problem

An electric rotating machine according to this application comprises a stator and a rotor located on a radially inner side of the stator, said electric rotating machine characterized in that:
- the stator is provided with: an iron core having an annular portion and multiple tooth portions extending from the annular portion to its radially inner side and circumferentially arranged to be spaced apart from each other; and windings wound around the tooth portions;
- the rotor is provided with multiple rotor blocks each having: a central body whose outer shape in cross-section perpendicular to its shaft center is a regular polygonal shape; and multiple permanent magnets placed on respective multiple flat portions of the central body corresponding to respective sides of the regular polygonal shape, said permanent magnets each having a cross-section perpendicular to the shaft center whose radially outer side is arc-like and whose radially inner side is linear;
- the multiple rotor blocks are aligned in an axial direction while being shifted in a circumferential direction from each other by a preset angle, and are rotatable integrally;
- the tooth portions are each provided with, at its head, flange parts circumferentially projecting toward heads of its adjacent tooth portions;
- the permanent magnets each have, at its circumferential center, a maximum height from the flat portion; and
- the flange parts each have, at its root, a radial thickness that is less than two-thirds of the maximum height of the permanent magnet.

An electric power steering apparatus according to this application comprises the above electric rotating machine.

Advantageous Effects of Invention

Since the thickness of the permanent magnet in the rotor of the electric rotating machine and the radial thickness at the root of the flange part in the stator thereof can be set properly, it is possible to eliminate unbalanced magnetic saturation at the flange parts of the heads of the tooth portions. This makes it possible to reduce an unbalance between torque ripples that are generated respectively by the upper-side rotor block and the lower-side rotor block when the electric power steering apparatus is driven under static steering conditions, to thereby achieve an electric rotating machine with a suppressed torque ripple.

With the use of the electric rotating machine, since an unbalance between the torque ripples is reduced, it is possible to achieve an electric power steering apparatus with a suppressed torque ripple.

DESCRIPTION OF EMBODIMENTS

Hereinafter, embodiments of this application will be described with reference to the drawings.

1. Embodiment 1

Figure 1:
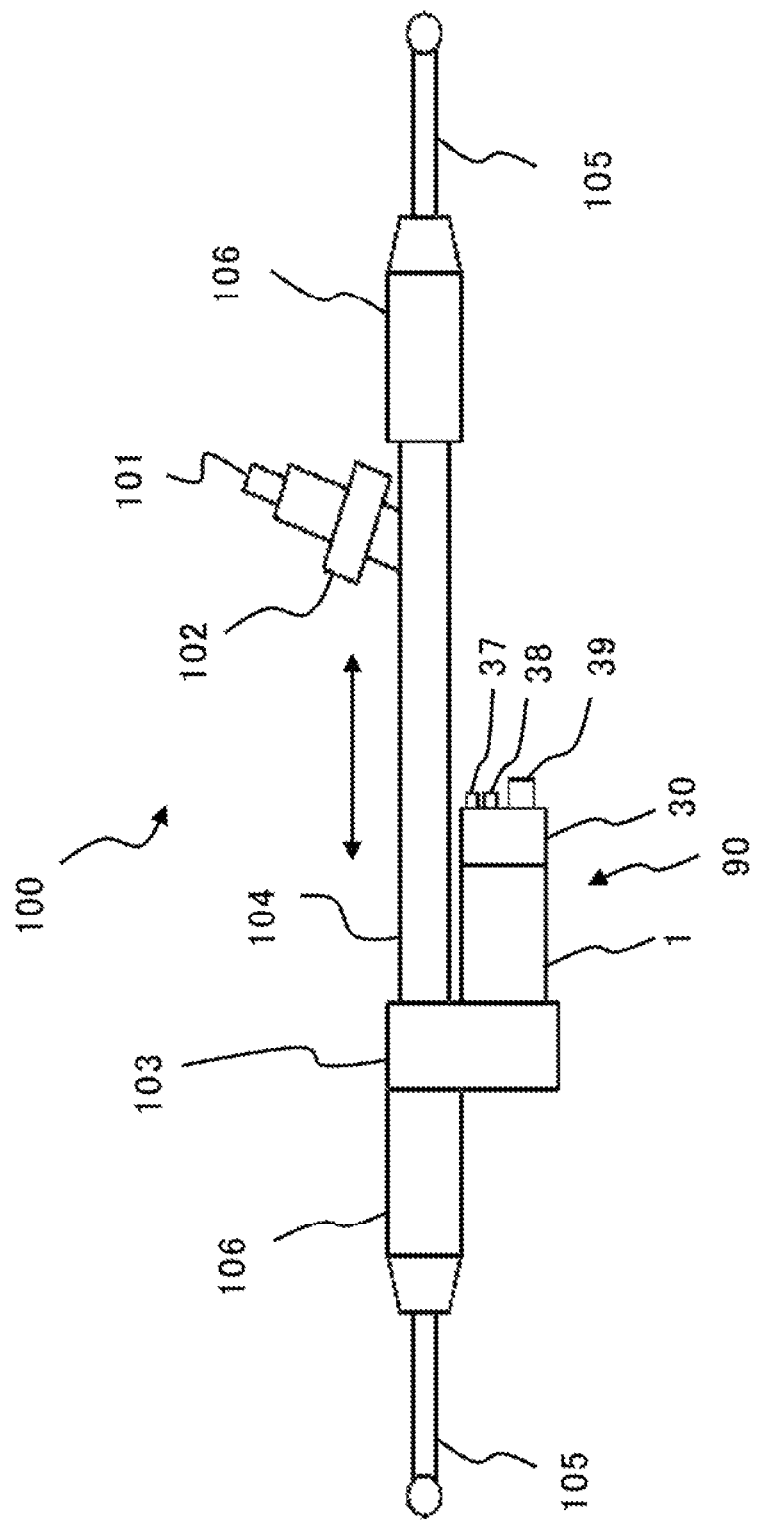
FIG. 1 is a configuration diagram of an electric power steering apparatus in which an electric rotating machine according to Embodiment 1 is mounted.

In FIG. 1, a configuration diagram of an electric power steering apparatus 100 in which an electric rotating machine 1 according to Embodiment 1 is mounted is shown. According to the electric power steering apparatus 100, when a driver turns a steering wheel (not illustrated), the corresponding torque is transferred to a shaft 101 through a steering shaft (not illustrated). On this occasion, the torque detected by a torque sensor 102 is converted into an electric signal and then transferred, by way of a cable (not illustrated) and through a first connector 37, to an ECU 30.

Further, vehicle information such as a vehicle speed and the like, is, after being converted into an electric signal, transferred through a second connector 38 to the ECU 30 of the electric power steering apparatus 100. The ECU 30 calculates a necessary assist torque from the above torque and the vehicle information such as a vehicle speed and the like, so that a current is supplied to the electric rotating machine 1 in the electric power steering apparatus 100, that is disposed adjacent to the ECU 30. The power for the ECU 30 is supplied thereto from a battery (not illustrated) and/or an alternator (not illustrated) through a power connector 39.

A torque generated by the electric rotating machine 1 produces, by way of a gear box 103 in which a belt (not illustrated) and a ball screw (not illustrated) are incorporated, a thrust force that causes a rack shaft (not illustrated) in a housing 104 to move in the axial direction, to thereby assist the steering force by the driver. Accordingly, a tie rod 105 moves and thus tires (not illustrated) are steered, and this makes it possible to turn the vehicle.

As the result, the driver is assisted by the torque of the electric rotating machine 1 and thus can turn the vehicle with a reduced steering force. A rack boot 106 is provided to prevent foreign materials from intruding into the inside of the device.

Figure 2:
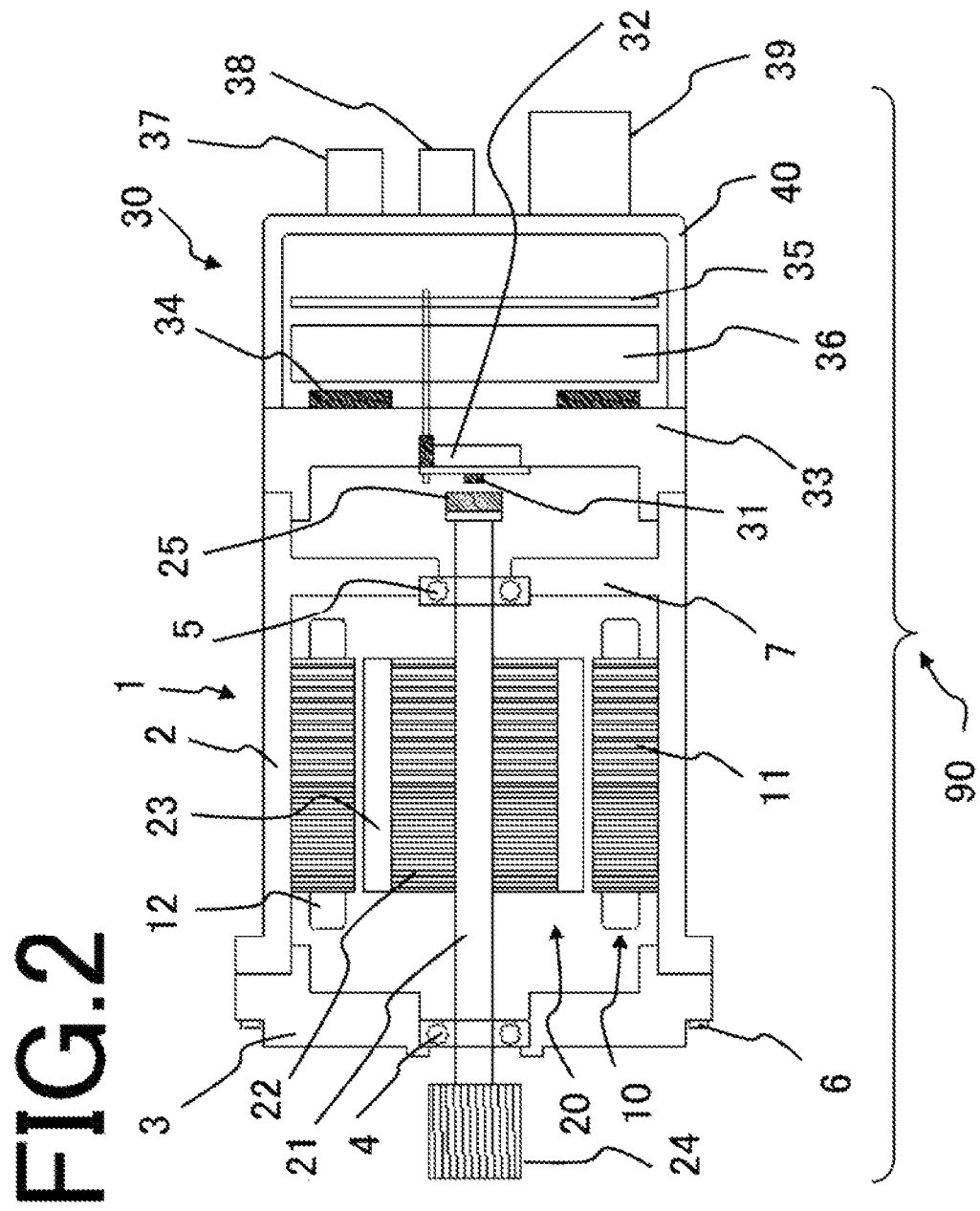
FIG. 2 is a cross-sectional view of an electric rotating machine device according to Embodiment 1 along its rotation shaft.

FIG. 2 is a cross-sectional view showing a cross-section of an electric rotating machine device 90 according to Embodiment 1 along its rotation shaft 21. The electric rotating machine device 90 is configured with the electric rotating machine 1 and the ECU 30. The electric rotating machine 1 includes: a stator 10; a cylindrically-shaped frame 2 with an inner wall on the surface of which the stator 10 is fixed; an electric rotating machine housing 3 that is fixed, using multiple bolts 6, to a one-side opening portion of the frame 2 so as to cover that portion; and a rotor 20 rotatably provided on the inner side of the stator 10.

The stator 10 has a stator iron core (referred to also as a stator core) 11 and armature windings 12. The stator iron core 11 is constituted in such a manner that magnetic core sheets, such as magnetic steel sheets or the like, are stacked together. The armature windings 12 are wound in the stator iron core 11.

The rotor 20 has the rotation shaft 21, a central body (referred to also as a rotor iron core or a rotor core) 22, permanent magnets 23, a pulley 24 and a permanent magnet 25 for sensor. The both end portions of the rotation shaft 21 are supported by a first bearing 4 fitted to the electric rotating machine housing 3 and a second bearing 5 fitted to a wall part 7. The central body 22 is constituted in such a manner that magnetic core sheets, such as magnetic steel sheets or the like, each having a regular polygonal shape, are stacked together. The central body 22 may be constituted by using a steel block. The rotation shaft 21 penetrates through the central body 22.

The permanent magnets 23 are disposed on respective multiple flat portions 22a of the central body 22 corresponding to the respective sides of a regular polygonal shape that the central body has in cross-section perpendicular to the rotation shaft 21. The pulley 24 is fixed to one end portion of the rotation shaft 21, and the permanent magnet 25 for sensor is fixed to the other end portion. On a wiring board 32, a magnetic sensor 31 as a rotation angle sensor is provided. The magnetic sensor 31 senses the position of the permanent magnet 25 for sensor that is opposite thereto, thus making it possible to detect the rotation angle of the rotation shaft 21.

The ECU 30 includes the aforementioned wiring board 32 on which the magnetic sensor 31 is mounted, a heatsink 33, switching elements 34, a control wiring board 35, an intermediate member 36 configured with a circuit for making connections between respective components, and so on. The control wiring board 35 calculates position information of the rotor 20 from the angle of the rotation shaft 21 detected by the magnetic sensor 31. Then, the control wiring board 35 on which a CPU is mounted, drives the switching elements 34 on the basis of the position information of the rotation shaft 20, to cause a current to be supplied to the electric rotating machine 1.

A torque ripple generated in the electric rotating machine 1 is transferred, as a vibration, to the gear box 103, the housing 104, the tie rod 105 and the shaft 101 that are illustrated in the foregoing FIG. 1. As the result, the electric power steering apparatus 100 itself and the vehicle in which the electric power steering apparatus 100 is attached are vibrated, so that an operation noise is generated. When the torque ripple is large, the generated operation noise also becomes large, so that a driver demand for quietness is not satisfied, resulting in reduced quality of the electric power steering apparatus 100.

In particular, at the time of static steering with the electric power steering apparatus 100, since a road-surface reaction force becomes larger, a force required for the steering wheel to steer becomes larger, so that the average torque generated by the electric rotating machine 1 also becomes larger. Accordingly, the torque ripple of the electric rotating machine 1 also becomes larger. In order to ensure the quality of the electric power steering apparatus 100, it is necessary to reduce the torque ripple of the electric rotating machine 1 under conditions to be applied to static steering.

The operation noise sensible by the driver is determined by peaks of respective order components of an operation noise. In addition, the peaks of the respective order components of the operation noise depend on peaks of respective order components of the torque ripple. Accordingly, as a torque ripple desired for the electric rotating machine 1 in the electric power steering apparatus 100, such a torque ripple is required at the time of static steering that has, for each of the order components, a waveform having an uppermost peak and a lowermost peak with a difference therebetween that is preferably 1% or less, more preferably 0.5% or less, relative to the average torque.

Further, with respect to the cogging torque of the electric rotating machine 1 that represents a torque ripple generated due to fluctuation of a magnetic attractive force between the rotor 20 and the tooth portions 11b of the stator 10 in a non-energized state, it is transferred to the steering wheel through the afore-mentioned gear box 103, housing 104, tie rod 105 and shaft 101, regardless of whether the electric power steering apparatus 100 is energized or not. Thus, when the cogging torque is large, a problem arises in that the aforementioned operation noise and a steering feeling with the steering wheel by the driver are degraded and thus the quality of the electric power steering apparatus 100 is reduced significantly. Thus, for the electric rotating machine 1, it is preferable to achieve reduction of the torque ripple and reduction of the cogging torque at the same time.

Figure 3:
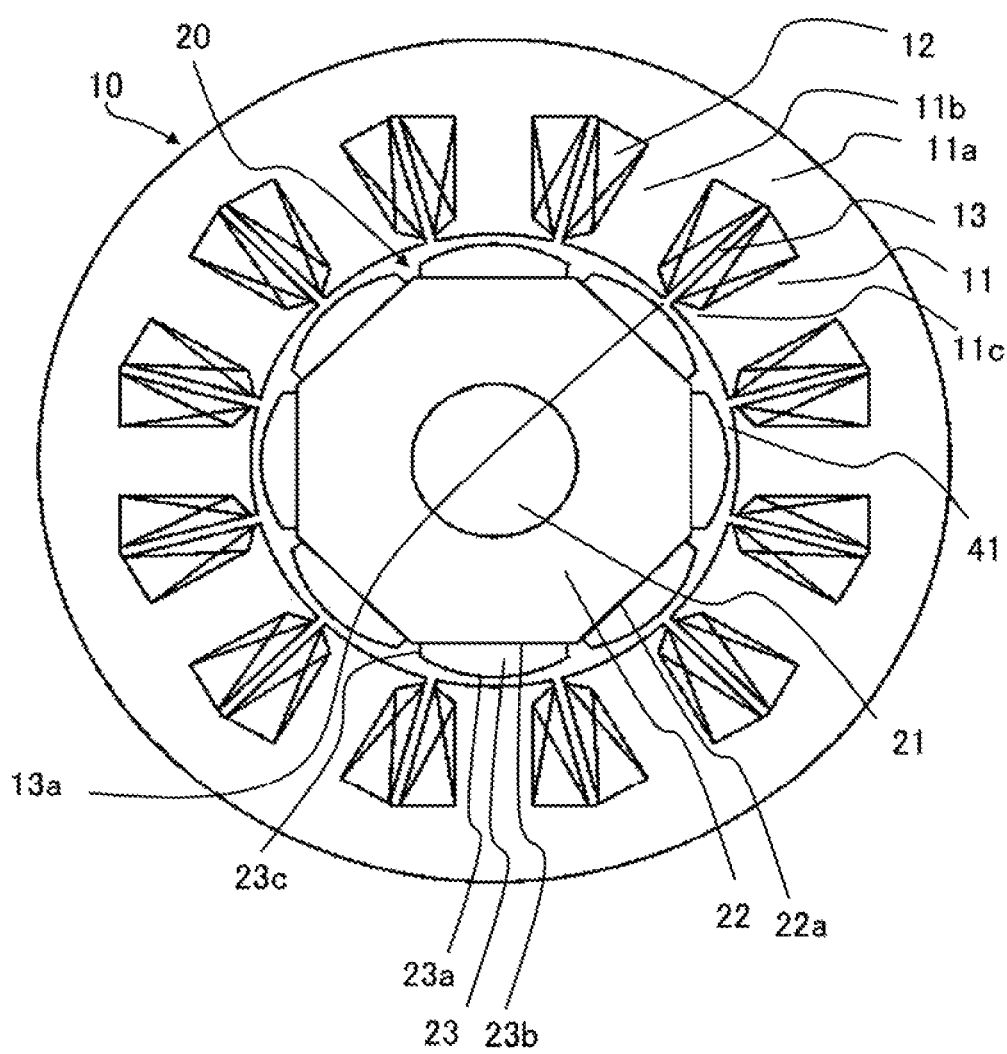
FIG. 3 is a cross-sectional view of the electric rotating machine according to Embodiment 1 perpendicular to its rotation shaft.

FIG. 3 is a cross-sectional view showing a cross-section of the electric rotating machine 1 according to Embodiment 1 perpendicular to the rotation shaft 21.

The stator 10 has an annular portion (referred to also as a core back) 11a and the tooth portions 11b. On the annular portion 11a, the total twelve number of tooth portions 11b each extending radially inward from the annular portion 11a are provided. Slots 13 are each formed between mutually adjacent ones of the tooth portions 11b. Further, in the slots 13, plural coil portions each composed of the armature winding 12 in a wound state are formed.

In the stator 10, the armature windings 12 each made of a copper wire are wound around the twelve number of tooth portions 11b through insulators (not illustrated) by concentrated winding. The tooth portions 11b are each provided with, at its head, flange parts 11c circumferentially projecting toward the heads of its adjacent tooth portions 11b.

The cogging torque is generated due to fluctuation of a magnetic attractive force between the rotor 20 and the tooth portions 11b of the stator 10. The fluctuation of the magnetic attractive force occurs due to varying magnetic attractive force at the opening 13a of the slot 13 between the tooth portions 11b during rotation of the rotor 20. The smaller the opening 13a of the slot 13, the smaller the fluctuation of the magnetic attractive force. Because of having the flange parts 11c, the opening 13a of the slot 13 can be made smaller, and thus the cogging torque due to rotation of the rotor 20 can be reduced. Accordingly, it is possible to reduce the operation noise of the electric power steering apparatus 100 provided with the electric rotating machine 1, and to improve the steering feeling.

The rotor 20 includes the rotation shaft 21, the central body (rotor iron core) 22 and the permanent magnets 23 that are provided on the inner side of the stator 10. The outer shape of the central body 22 in cross-section perpendicular to the shaft center is a regular octagonal shape, and the permanent magnets 23 are provided on the respective multiple flat portions 22a corresponding to the respective sides of the regular octagonal shape. The permanent magnets 23 each have a magnet radially-outer surface 23a on its radially outer side and a magnet radially-inner surface 23b on its radially inner side, in which said magnet radially-outer surface is arc-like and said radially-inner surface is linear, as viewed in a cross-section perpendicular to the shaft center. Magnet end surfaces 23c each have a flat shape that is almost perpendicular to the flat surface of the magnet radially-inner side.

In general, a rare earth magnet is used as the permanent magnet 23. This is because an electric rotating machine mounted in the vehicle is required to be compact and light and to have a durability, and thus the rare earth magnet is ideal. As the rare earth magnet, a magnet produced by sintering, such as, a neodymium magnet (Nd2Fe14B), a samarium cobalt magnet (SmCo5, Sm2Co17), an alnico magnet (Al—Ni—Co) or the like, may be employed. Such a rare earth magnet produced by sintering is suited for use in the electric rotating machine because it has a remanent flux density enough to cause the electric rotating machine to generate the necessary torque. A neodymium sintered magnet having a remanent flux density of 1.1 T or more, that is a most widely used magnet, may be used. Here, "T" denotes Tesla that is a unit indicating the magnitude of a remanent flux density per unit area.

The permanent magnets 23 are adhered using an adhesive to the central body 22 whose shape in cross-section perpendicular to the rotation shaft 21 is a regular polygonal shape. Further, though not illustrated, a cover composed of a SUS (Stainless Steel) that is non-magnetic is wound around the outer circumferential portion of the rotor 20 facing the magnetic gap, so as to surround eight permanent magnets 23. This provides an effect of increasing the fixing strength of the permanent magnet 23 and preventing scattering of the permanent magnet 23. It is noted that a regular polygonal shape described herein means shapes including not only a regular polygon but also a shape that results from an addition of a small modification to a regular polygon as a basic shape, as represented by the case where its corners are chamfered, its corners are rounded, or a recess or projection for positioning of the permanent magnet is formed on the flat portion 22a. In Embodiment 1, such a central body 22 is used whose shape in cross-section perpendicular to the rotation shaft 21 is a regular octagon; however, there is no problem if such a central body 22 is used whose shape in cross-section perpendicular to the rotation shaft 21 is a regular octagonal shape, as represented by the case where the cross-section perpendicular to the rotation shaft 21 is a regular octagon whose corners are chamfered, a regular octagon whose corners are rounded, or a regular octagon having a recess or a projection for positioning of the permanent magnet 23 on the flat portion 22a. Such a small deformation in shape does not cause an essential change of the configuration of the electric rotating machine according to this application, and thus does not disturb the effect of the electric rotating machine according to this application, so that the small deformation in shape shall be allowed. Examples of the regular polygon, other than a regular octagon, include regular multi-lateral shapes such as a regular tetragon, a regular hexagon, etc., and the same as described above applies to them.

Since the cross-section of the permanent magnet 23 has an arc-like shape, it is possible to smooth the magnetic flux density in a magnetic gap region 41 between the stator 10 and the rotor 20, to thereby reduce the torque ripple. Further, such an effect is obtained that it is easy to wind the cover made of a non-magnetic SUS. Furthermore, since other than the radially-outer side of the permanent magnet 23, the magnet radially-inner side and the magnet end surfaces are flat shaped, there is an advantage that it is easy to perform machining of the permanent magnet 23.

Moreover, since the radially-inner side of the permanent magnet 23 and the flat portion 22a of the central body 22 of the rotor 20 are both flat, a gap between the permanent magnet 23 and the central body 22 of the rotor 20 can be reduced, so that such an effect is obtained that it is possible to increase the adhesion strength in the case where the permanent magnet 23 is adhered using an adhesive. Further, magnetic fluxes of the magnet are due to magnetization in a direction perpendicular to the magnet radially-inner surface. When the directions of the magnetic fluxes are uniformized, the amount of magnetic fluxes interlinked with the armature winding 12 of the stator 10 can be increased, so that it becomes possible to increase the torque of the electric rotating machine 1.

Further, since the electric rotating machine 1 having 8 magnetic poles and 12 tooth portions 11b is a machine in which four magnetic circuits each composed of 2 magnetic poles and 3 tooth portions 11b, are arranged in a circumferential direction, it has a characteristic that the stator 10 may be deformed into a tetragon when the electric rotating machine 1 is driven. Thus, the amount of vibration of the stator 10 can be reduced relative to the electric rotating machine 1 whose stator may be deformed into an ellipse or triangle. This also provides an effect of making it possible to achieve reduction of the operation noise of the electric power steering apparatus 100.

Figure 4:
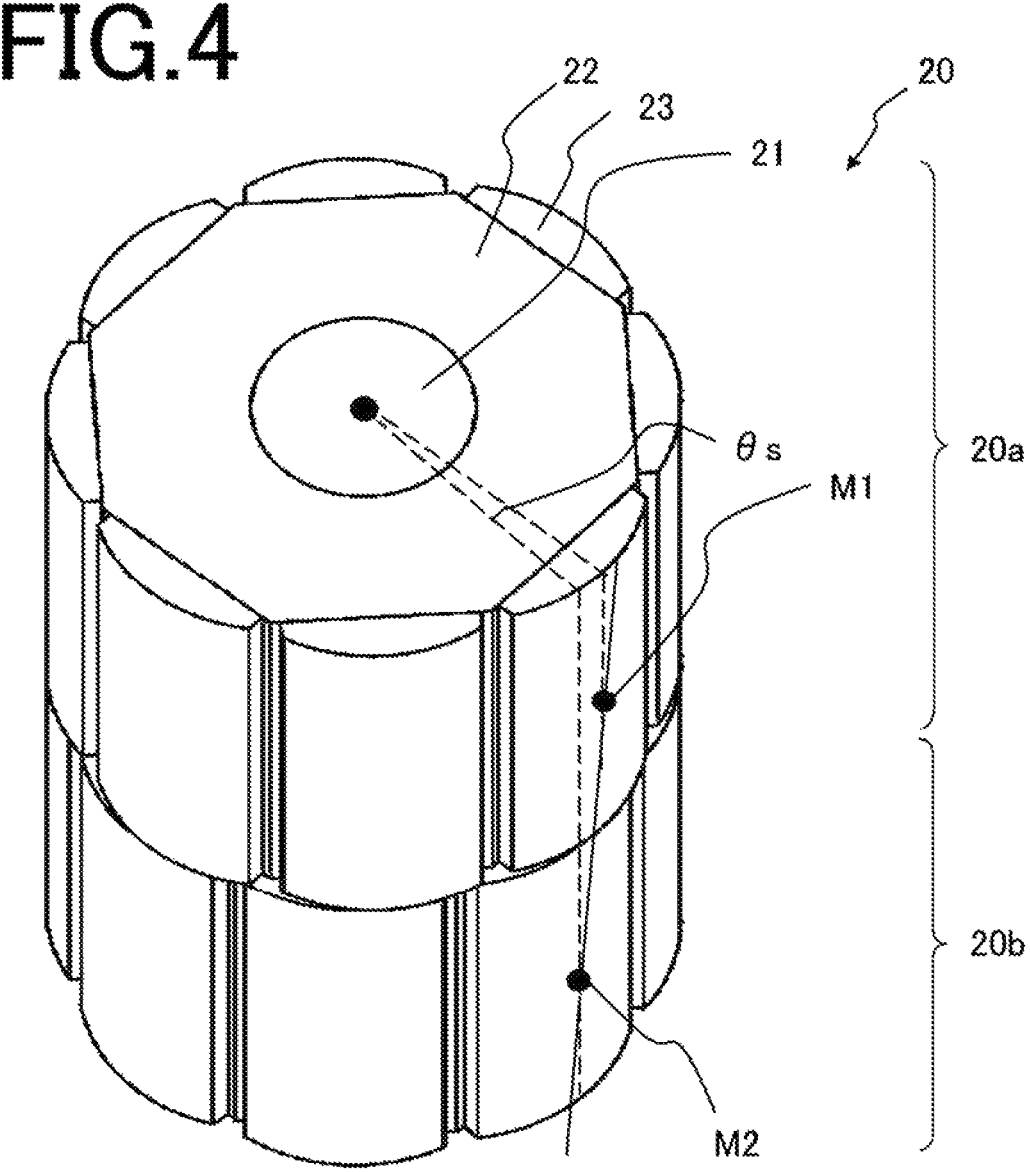
FIG. 4 is a diagram showing a rotor of the electric rotating machine according to Embodiment 1.

FIG. 4 is a perspective view showing the rotor 20 of the electric rotating machine 1 according to Embodiment 1. Two rotor blocks 20a, 20b are provided adjacent to each other in the axial direction of the rotation shaft 21. Each of the rotor blocks 20a, 20b has: a central body 22 whose shape in cross-section perpendicular to the rotation shaft 21 is a regular octagon; and the total eight number of permanent magnets 23 that are provided on the respective flat portions 22a of the central body 22 corresponding to the respective sides of the regular octagon. Further, two rotor blocks 20a, 20b have a two-stage skew structure in which they are disposed to be shifted in the circumferential direction from each other. Here, the definition of a skew angle θs will be described. The skew angle θs is an angle created between the respective axes toward the rotation shaft 21 with respect to the upper-side rotor block 20a and the lower-side rotor block 20b. It is a mechanical angle about the two permanent magnets 23 created circumferentially between their centers M1 and M2, and specifically, it is an angle created circumferentially between the respective lines from the centers M1, M2 toward the rotation shaft 21 of the rotor 20.

Here, the circumferential skew angle θs is set so that, with respect to the torque ripples of the upper-side rotor block 20a and the lower-side rotor block 20b, their electric angle 6th-order components are cancelled, the set value of which will be described later. Since two rotor blocks 20a, 20b are disposed to be shifted in the circumferential direction from each other, the 6th-order components in the respective torque ripples generated by the rotor blocks 20a, 20b are mutually cancelled, so that such an effect is obtained that the torque ripples are reduced.

Figure 5:
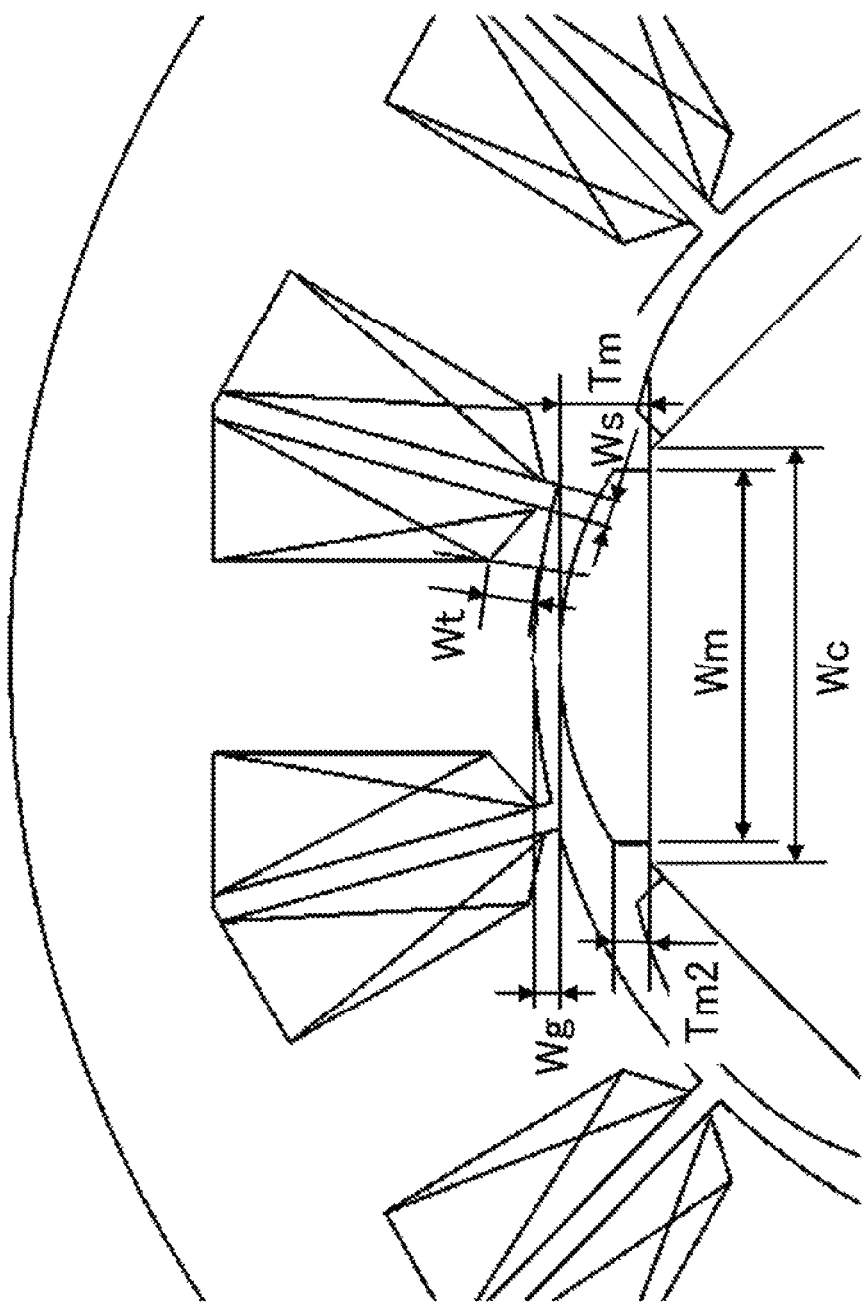
FIG. 5 is an enlarged illustration about the cross-sectional view of the electric rotating machine according to Embodiment 1 perpendicular to the rotation shaft.

FIG. 5 shows an enlarged view of a cross-section of the electric rotating machine 1 according to Embodiment 1 perpendicular to the rotation shaft 21. Shown herein is an enlarged view of the cross-section of the electric rotating machine 1 according to Embodiment 1 in which details of sizes are indicated. With respect to the permanent magnet 23, a permanent-magnet maximum height in a direction perpendicular to the flat portion 22a of the central body 22 is defined as "Tm", a permanent-magnet minimum height in the same direction perpendicular to the flat portion 22a is defined as "Tm2" and a width of the permanent magnet at its bottom surface is defined as "Wm". Note that, in the case where chamfered portions are formed at the corner parts of the permanent magnet, the permanent-magnet minimum height Tm2 is calculated as a height of an intersection point from the flat portion 22a, said intersection point assumed between: a virtual line corresponding to the arc-like magnet radially-outer surface in the case of having no chamfered portion; and a perpendicular line rising from the flat portion 22a.

A maximum radial thickness of the root portion of the flange part 11c is defined as a flange-part root radial thickness Wt. Specifically, such a size is defined as the flange-part root radial thickness Wt that is measured from a slot 13-side point in the root portion of the flange part 11c up to the magnetic-gap-region facing side of the root portion of the flange part 11c, in a direction toward the center of the rotation shaft 21 of the electric rotating machine 1.

The length of the opening 13a of the slot 13, that is a minimum length between the adjacent flange parts 11c, is defined as a gap Ws between adjacent flange parts.

Further, a size of a magnetic gap region that is minimum between the rotor 20 and the stator 10 is defined as a minimum gap Wg between the rotor and the stator. However, in the value of this gap, the thickness of the cover made of a non-magnetic SUS (not illustrated) shall be excluded.

Further, a length of one side of the central body (referred to also as a rotor core) whose shape in cross-section perpendicular to the rotation shaft 21 is a regular polygon, is defined as a width "Wc". However, in the case of the central body whose shape in cross-section perpendicular to the rotation shaft 21 is a nearly regular polygon but is not a regular polygon as the shape shown in this Embodiment, a length on a virtual line corresponding to the case where the shape of the central body in cross-section is assumed to be a regular polygon, is defined as the above width.

Figure 6:
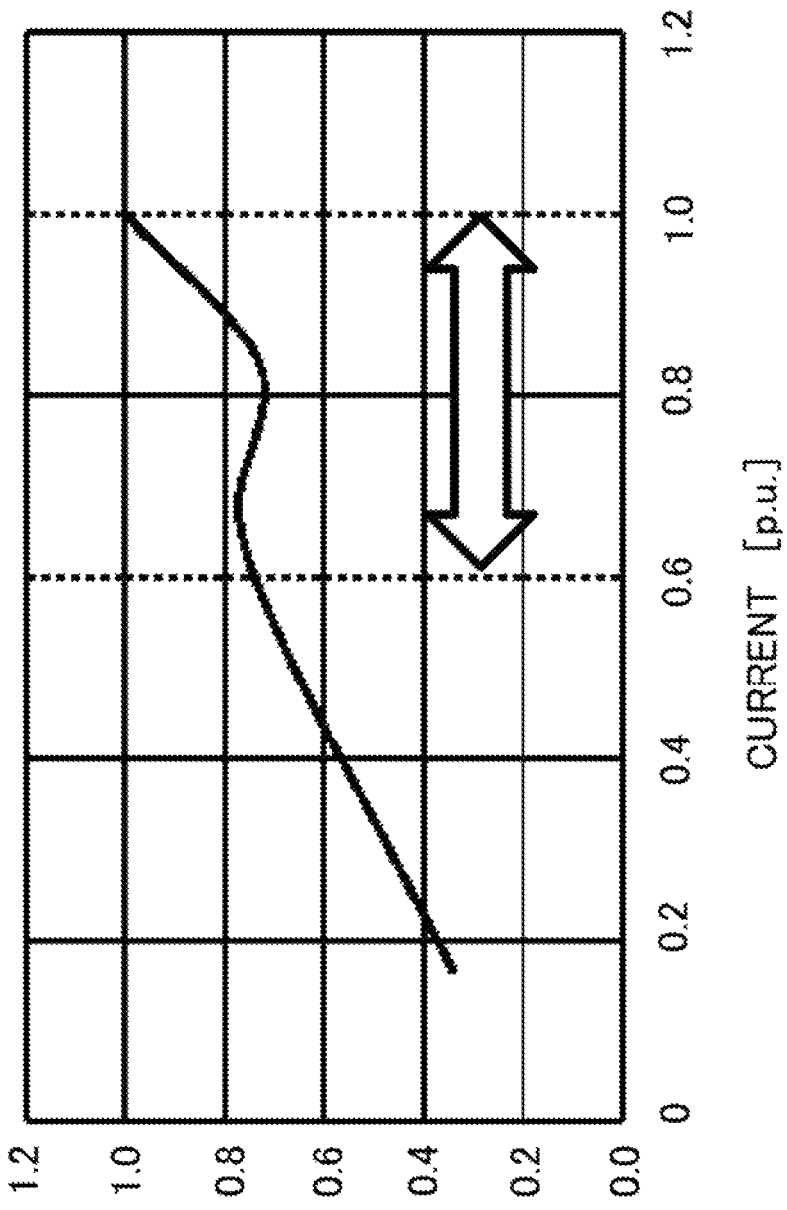
FIG. 6 is a diagram showing a simulation result of a torque ripple relative to a current of the electric rotating machine according to Embodiment 1.

FIG. 6 is a diagram showing a simulation result of a characteristic of a torque ripple relative to a current of the electric rotating machine 1 according to Embodiment 1. As a premise for the following simulations, such a case is assumed where, as the permanent magnet, a neodymium sintered magnet having a remanent flux density of 1.1 T or more is used on behalf of the rare earth magnet. Shown herein is a result with respect to the torque ripple, that is obtained when an amplitude between peaks in an electric angle 6th-order component that is a basic component according to an eight-pole twelve-slot configuration is standardized by division by the average torque. In this figure, since the value of a current required for static steering is from 0.6 to 1.0 [p.u.], it is found that the torque ripple becomes much larger when such a current is supplied. Here, "[p.u.]" indicates that the value is represented by the p.u. method and thus indicates a relative amount with respect to a reference value.

Figure 7:
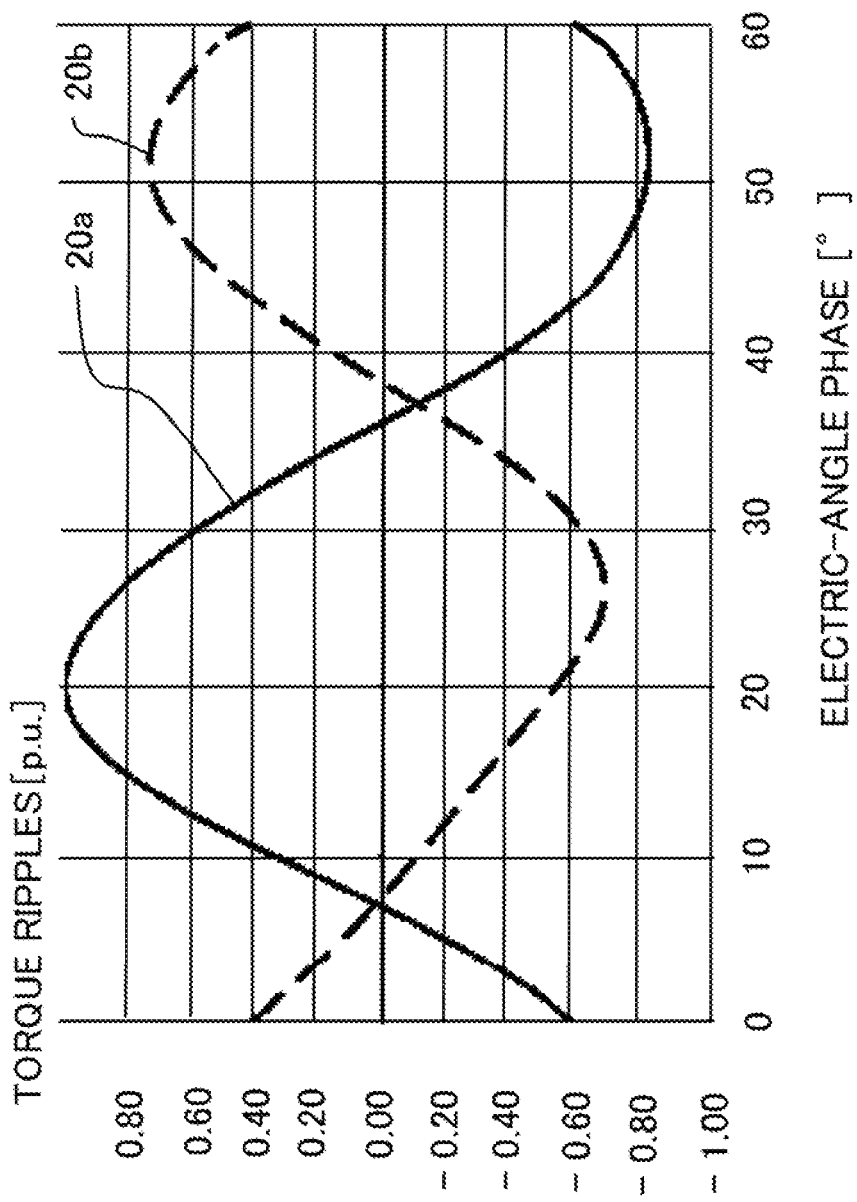
FIG. 7 is a diagram showing simulation results of torque ripples of the respective rotor blocks in the electric rotating machine according to Embodiment 1.

In FIG. 7, a simulation result is shown when the respective torque ripple waveforms generated by the aforementioned rotor blocks 20a, 20b under a current condition of 1.0 [p.u.] in the above figure, are standardized. It is noted that this figure shows only a portion corresponding to an electric-angle phase of 60 degrees, and in which one peak indicates a region corresponding to an electric angle 6th-order component of the torque ripple.

With respect to the aforementioned two rotor blocks 20a, 20b, it is found that a mutual difference occurs in phase and amplitude between the torque ripple 6th-order component generated by the rotor block 20a and the torque ripple 6th-order component generated by the rotor block 20b. This is because the rotor block 20a and the rotor block 20b have a phase difference in the circumferential direction, so that, with respect to a rotating magnetic field created by the armature windings 12 of the stator 10, the rotor block 20a located on the leading side (rotation forward side) and the rotor block 20b located on the lagging side (rotation backward side) are subjected to a strong field and a weak field, respectively.

The magnet flux on the leading side (strong field) is intensified, so that, in particular, the flange parts 11c of the head of the tooth portion 11b corresponding to the central body 22 on the leading side are saturated magnetically. However, the flange parts 11c on the lagging side are not saturated magnetically. Due to the foregoing effect, unbalanced magnetic saturation occurs, so that the respective amplitudes and phases of the torque ripple components generated by the two-stage skew portions will vary. Thus, there is a problem that the torque ripples may not be cancelled, causing an increase of the torque ripple. Note that, in this figure, a case is shown where the rotor block 20a is provided with a leading phase.

In order to eliminate the unbalanced magnetic saturation at the flange parts 11c of the heads of the tooth portions 11b, it is effective if the flange parts 11c corresponding to the rotor block 20*a* and those corresponding to the rotor block 20*b* are magnetically saturated in a mutually balanced manner under static steering conditions. The magnetic saturation at the flange parts 11*c* under static steering conditions is influenced by a leading or lagging relation in phase that is determined by the magnetic flux generated by the aforementioned armature windings 12 and the skew angle θs. In addition, the magnetic saturation at the flange parts 11*c* under static steering conditions is also influenced by: the magnet flux determined depending on the thickness of the permanent magnet 23; and the magnetic circuit at the head of the tooth portion 11*b* that is determined depending on the shape of the flange part 11. Accordingly, it is effective to properly set the skew angle θs, the thickness of the permanent magnet 23 and the width of the flange part 11*c* of the tooth portion 11*b*.

FIG. 8 to FIG. 11 are diagrams each showing a simulation result of about a torque ripple according to Embodiment 1. In each of the figures, the torque ripple is indicated as an electric angle 6th-order component and specifically, a result obtained when an amplitude between peaks in the electric angle 6th-order component is divided by the average torque is shown.

By properly setting the above parameters, it is possible to eliminate the unbalanced magnetic saturation at the flange parts 11*c* of the heads of the tooth portions 11*b*. Thus, when the electric power steering apparatus 100 is driven under static steering conditions, it is possible to reduce an unbalance between the torque ripples that are generated respectively by the rotor block 20*a* and the rotor block 20*b*. The torque ripple can be reduced to 1% relative to an assist torque. Accordingly, it is possible to achieve reduction of the operation noise of the electric power steering apparatus 100.

Figure 8:
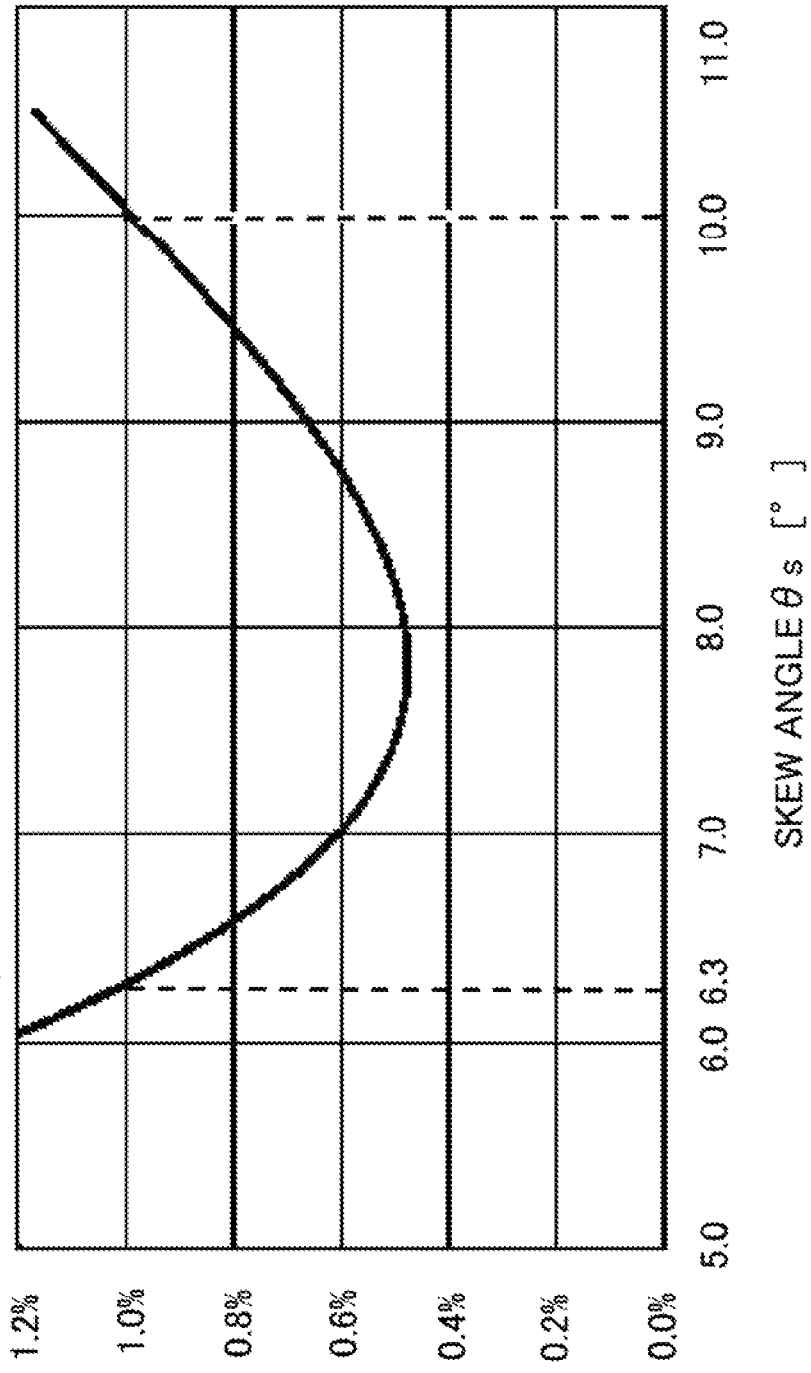
FIG. 8 is a diagram showing a simulation result of a torque ripple relative to a skew angle, according to Embodiment 1.

FIG. 8 is a diagram showing a torque ripple relative to a skew angle θs, according to Embodiment 1. This figure is a simulation result that represents a relationship between a skew angle θs and a torque ripple 6th-order component when the skew angle is varied. When the skew angle θs becomes smaller or larger around a skew angle θs of about 7.8°, the torque ripple becomes larger.

This is because, when the skew angle θs becomes larger, the aforementioned magnet flux on the leading side (strong field) is further intensified, so that the flange parts 11*c* of the head of the tooth portion 11*b* corresponding to the central body 22 on the leading side are magnetically saturated more differently from the flange parts 11*c* on the lagging side. On the other hand, this is because, when the skew angle θs becomes smaller, the phase shift between the torque ripple waveforms is not matched with the phase shift between the rotor block 20*a* and the rotor block 20*b*, so that a sufficient cancelling effect cannot be obtained.

In Embodiment 1, the skew angle θs is set to satisfy 6.3<θs<10.0, so that it is possible to reduce the torque ripple to 1% or less.

Figure 9:
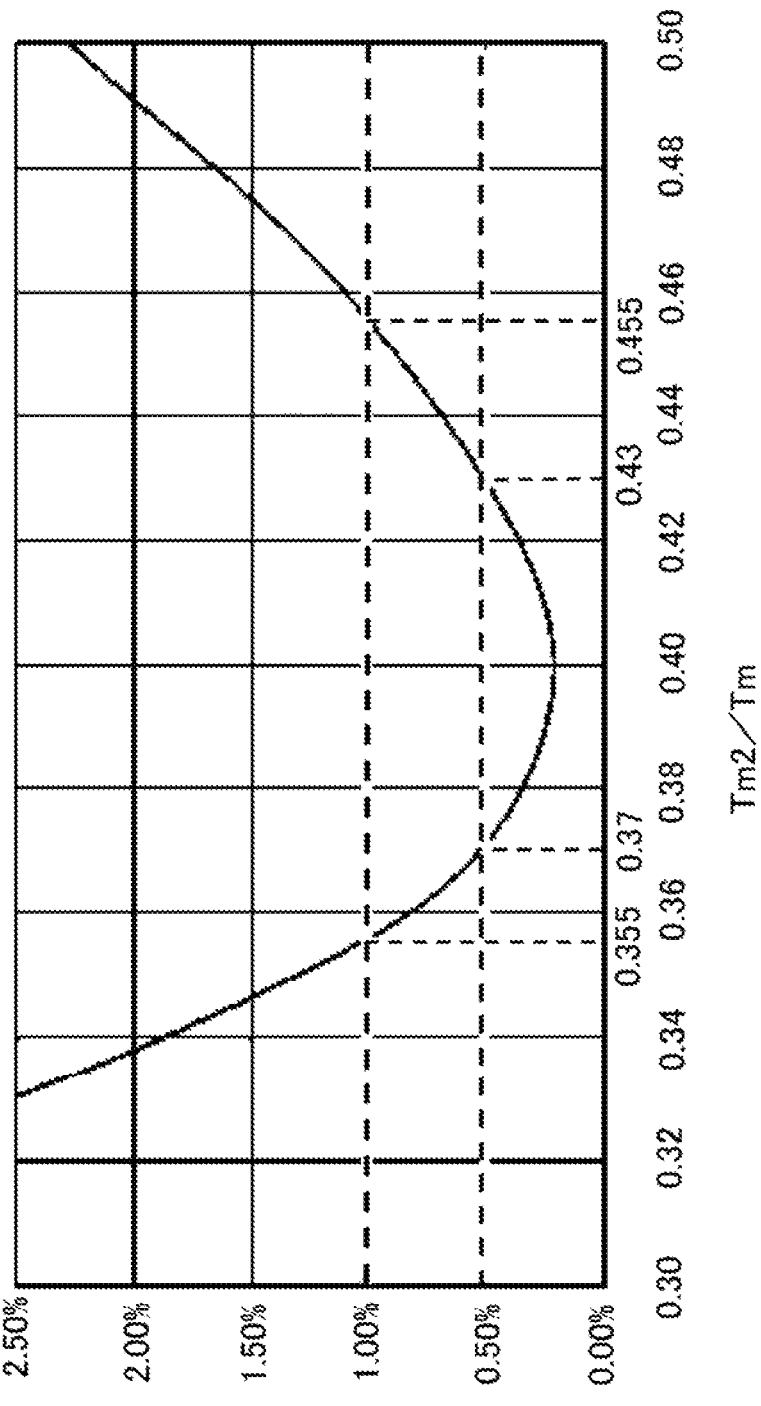
FIG. 9 is a diagram showing a simulation result of a torque ripple relative to a ratio Tm2/Tm, according to Embodiment 1.

FIG. 9 is a diagram showing a torque ripple relative to a ratio Tm2/Tm, according to Embodiment 1. This figure is a simulation result in the case where the skew angle θs is set within the foregoing range, that represents a relationship between said ratio and a torque ripple 6th-order component when the shape of the permanent magnet is varied.

There is shown a relationship between the ratio Tm2/Tm that is a ratio between the permanent-magnet maximum height Tm and the permanent-magnet minimum height Tm2 that define the shape of the permanent magnet, and the torque ripple 6th-order component, when the ratio Tm2/Tm is varied. When the ratio Tm2/Tm becomes smaller or larger around the ratio of about 0.4, the torque ripple becomes larger.

When a permanent-magnet end thickness, that is, the permanent-magnet minimum height Tm2, becomes smaller and the ratio Tm2/Tm becomes smaller than 0.4, a magnet thickness at a magnet portion facing the rotor block 20*a* on the leading side becomes much smaller than a magnet thickness at a corresponding magnet portion facing the rotor block 20*b* on the lagging side.

On this occasion, magnetic saturation on the leading side is relatively reduced and thus unbalanced magnetic saturation occurs, so that the torque ripple becomes larger. Namely, the cancelling effect due to the skew angle θs on the ripples cannot be obtained sufficiently, so that the torque ripple increases.

In contrast, when the permanent-magnet end thickness, that is, the permanent-magnet minimum height Tm2, becomes larger and the ratio Tm2/Tm becomes larger than 0.4, since the thickness of the magnet at its end becomes larger, the variation of the magnetic flux density in the gap becomes larger and thus the density is not smooth, so that the torque ripple becomes larger.

In Embodiment 1, the ratio Tm2/Tm between the permanent-magnet maximum height Tm and the permanent-magnet minimum height Tm2 that define the shape of the permanent magnet, is set to satisfy 0.355<Tm2/Tm<0.455, so that it is possible to reduce the torque ripple to 1% or less.

Figure 10:
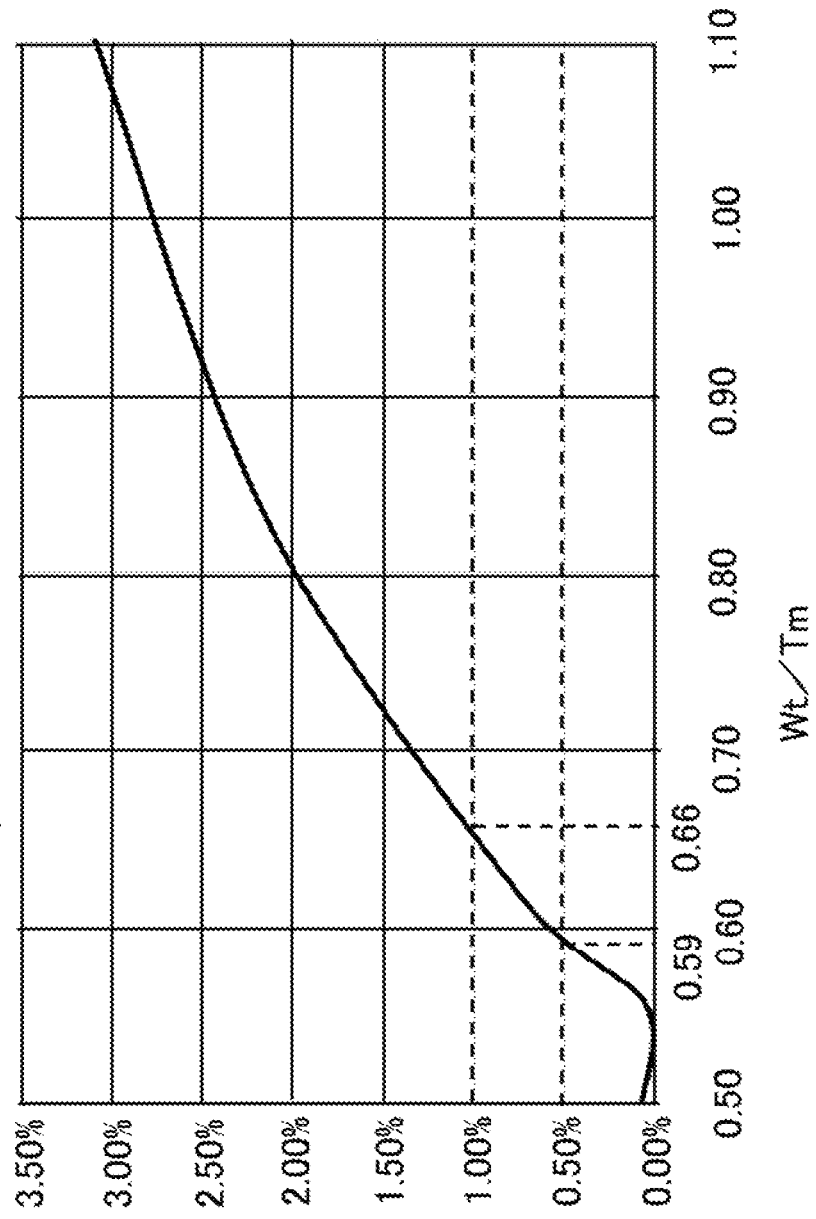
FIG. 10 is a diagram showing a simulation result of a torque ripple relative to a ratio Wt/Tm, according to Embodiment 1.

FIG. 10 is a diagram showing a torque ripple relative to a ratio Wt/Tm, according to Embodiment 1. Simulation has been executed with the skew angle θs and the ratio Tm2/Tm set in the following ranges.

$$6.3 < \theta s < 10.0$$

$$0.355 < Tm2/Tm < 0.455$$

Shown in FIG. 10 is a simulation result that represents a relationship between the ratio Wt/Tm that is a ratio of the flange-part root radial thickness Wt to the permanent-magnet maximum height Tm, and the torque ripple 6th-order component, when the ratio Wt/Tm is varied under the above conditions.

When the ratio is set to satisfy Wt/Tm<0.66, it is possible to reduce the torque ripple to 1% or less. In other words, it suffices to set the flange-part root radial thickness Wt to be smaller than two-thirds of the permanent-magnet maximum height Tm.

This results in a decreased width of the flange part 11*c* relative to the magnetic flux amount of the permanent magnet 23, so that the rotor block 20*a* and the rotor block 20*b* are both saturated magnetically and thus the unbalance is eliminated. Accordingly, it is possible to reduce the torque ripple.

As described above, by properly setting the skew angle θs, the ratio Tm2/Tm that determines the shape of the permanent magnet 23, and the ratio Wt/Tm that corresponds to a ratio of the flange part root radial thickness to the magnetic flux amount of the permanent magnet, it is possible to reduce the torque ripple. This makes it possible to apply the electric power steering apparatus 100 provided with the electric rotating machine 1 having 8 magnetic poles and 12 tooth portions 11*b*, to a vehicle which is required to have a low operation noise, such as, an EV, an HEV or the like.

In FIG. 3 to FIG. 5, a case is shown where the number of poles is eight and the number of slots is twelve; however, a similar effect is also obtained if the number of pole is 2N and the number of slots is 3N (N denotes a natural number). In this case, however, the skew angle θs is set as follows.

$$25.2/N<\theta s<40.0/N$$

When it is so set, the torque ripple can be reduced to 1% or less. Further, if "N" is set to 4 or more as described above, it is possible to limit the deformation shape of the stator 10 to a tetragon or a polygon more than a tetragon. As a result, it is possible to reduce the amount of vibration of the frame 2 in comparison to an electric rotating machine 1 having a stator 10 whose deformation shape is an ellipse or triangle. This makes it possible to reduce the vibration of the electric rotating machine 1, to thereby achieve further reduction of the operation noise of the electric power steering apparatus 100.

In conclusion, in the case where the number of poles is 2N and the number of slots is 3N (N denotes a natural number), it is possible to reduce the torque ripple to 1% or less, by setting:

the skew angle θs to satisfy 25.2/N<θs<40.0/N;
the ratio between the permanent-magnet maximum height Tm and the permanent-magnet minimum height Tm2 that define the magnet shape, to satisfy 0.355<Tm2/Tm<0.455; and
the ratio of the flange-part root radial thickness Wt to the permanent-magnet maximum height Tm to satisfy: Wt/Tm<0.66.

This makes it possible to apply the electric power steering apparatus 100 provided with the electric rotating machine having 2N magnetic poles and 3N tooth portions 11b, to a vehicle which is required to have a low operation noise, such as, an EV, an HEV or the like.

In Embodiment 1, a case is shown in FIG. 3 to FIG. 5 where a ratio between the outer diameter of the stator 10 and the outer diameter of the rotor 20 is from 48% to 52%. If this outer diameter ratio is increased, the volume of the stator iron core 11 is reduced and thus an area through which the magnetic fluxes generated by the rotor 20 and the armature windings 12 pass is reduced, so that the magnetic flux amount is reduced. If the outer diameter ratio is decreased, the volume of the central body 22 and the permanent magnets 23 are reduced, so that the magnetic flux amount is reduced.

When the ratio is set to from 48% to 52% as in Embodiment 1, it is possible to increase the magnetic flux amount. Accordingly, it becomes possible to reduce the aforementioned torque ripple to 1.0% or less and to increase the intended average torque necessary for the electric power steering apparatus 100, at the same time.

Meanwhile, a gap may be created in the direction of the rotation shaft 21 between the rotor block 20a and the rotor block 20b, said gap having a size corresponding to 0.1% to 1.5% of the total axial size of the rotor blocks 20a, 20b. This makes it possible to reduce leakage of magnetic flux that occurs between the rotor blocks 20a, 20b, to thereby achieve reducing the torque ripple and increasing the average torque, at the same time.

Figure 11:
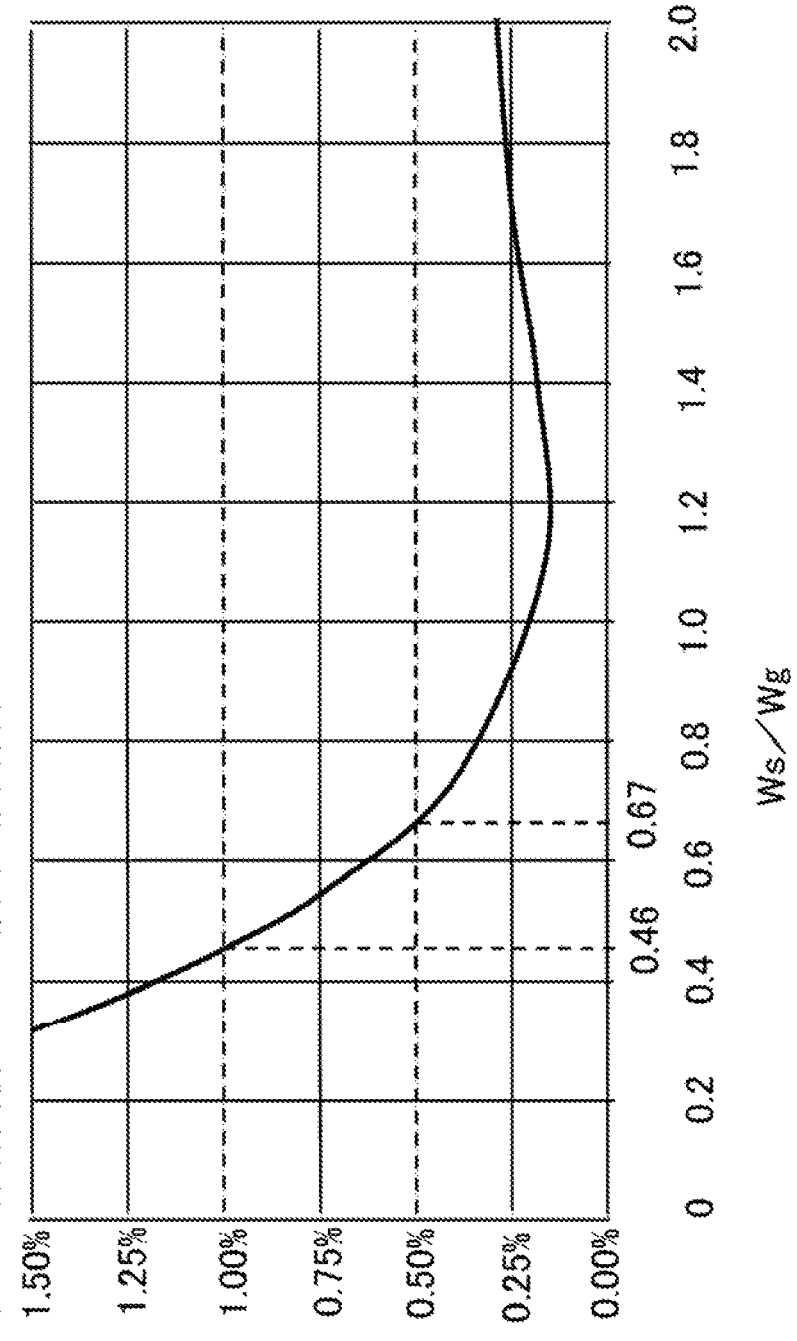
FIG. 11 is a diagram showing a simulation result of a torque ripple relative to a ratio Ws/Wg, according to Embodiment 1.

FIG. 11 is a diagram showing a torque ripple relative to a ratio Ws/Wg, according to Embodiment 1. Shown herein is a simulation result about a relationship of a torque ripple 6th-order component to the ratio Ws/Wg that is a ratio of the gap Ws between adjacent flange parts to the minimum gap Wg between the rotor and the stator. With respect to the gap Ws between adjacent flange parts and the minimum gap Wg between the rotor 20 and the stator 10, when the ratio Ws/Wg is small, the torque ripple increases.

When the gap Ws between adjacent flange parts is narrowed, the opening 13a of the slot 13 becomes narrower. On this occasion, leakage of the magnetic flux passing through the flange parts 11c between the tooth portions 11b increases. Thus, the degree of magnetic saturation unbalance between the rotor block 20a and the rotor block 20b increases. This results in increased torque ripple.

When the ratio Ws/Wg that is a ratio of the gap Ws between adjacent flange parts to the minimum gap Wg between the rotor and the stator, is set to satisfy Ws/Wg>0.46, such an effect is obtained that not only that the torque ripple can be reduced to 1% or less, but also that the torque ripple can be reduced further than otherwise.

Further, as the aforementioned magnet width Wm of the permanent magnet 23 becomes larger, the magnetic flux amount of the permanent magnet increases and thus the torque of the electric rotating machine 1 can be increased. In Embodiment 1, a ratio Wm/Wc of the magnet width Wm to the one side length Wc is set to 88% or more, provided that, for the central body whose shape in cross-section perpendicular to the rotation shaft 21 is a nearly regular polygon, said one side length is assumed to be a length of an extended side that is extended from the corners along a virtual line and corresponds to one side when the cross-section is assumed to be a regular polygon as shown in FIG. 5. This makes it possible to achieve an effect of reducing the torque ripple and an effect of increasing the torque of the electric rotating machine 1, at the same time.

Description will be made on how to further reduce the torque ripple of the electric rotating machine 1 of Embodiment 1. By more exactly setting the ratio Tm2/Tm that is a ratio between the permanent-magnet maximum height Tm and the permanent-magnet minimum height Tm2 that define the shape of the magnet, and the ratio Wt/Tm that is a ratio of the flange-part root radial thickness Wt to the permanent-magnet maximum height Tm, it becomes possible to further reduce the torque ripple.

According to FIG. 9, when the ratio Tm2/Tm is set to satisfy 0.37<Tm2/Tm<0.43, it is possible to reduce the torque ripple to 0.5% or less.

According to FIG. 10, when the ratio Wt/Tm is set to satisfy Wt/Tm<0.59, it is possible to reduce the torque ripple to 0.5% or less.

Since the torque ripple can be further reduced, it becomes possible to achieve quietness necessary for the electric power steering, to a further extent. Thus, it is possible to further reduce the operation noise of the electric power steering apparatus 100 provided with the electric rotating machine 1 having 2N magnetic poles and 3N tooth portions 11b (N denotes a natural number).

In addition to the above, when the ratio Ws/Wg that is a ratio of the gap Ws between adjacent flange parts to the minimum gap Wg between the rotor and the stator is set to satisfy Ws/Wg>0.67, namely, when the gap Ws between adjacent flange parts is set to be larger than two-thirds of the minimum gap Wg between the rotor and the stator, it is possible to reduce the torque ripple to 0.5% or less, and thus to further reduce the torque ripple.

2. Embodiment 2

Figure 12:
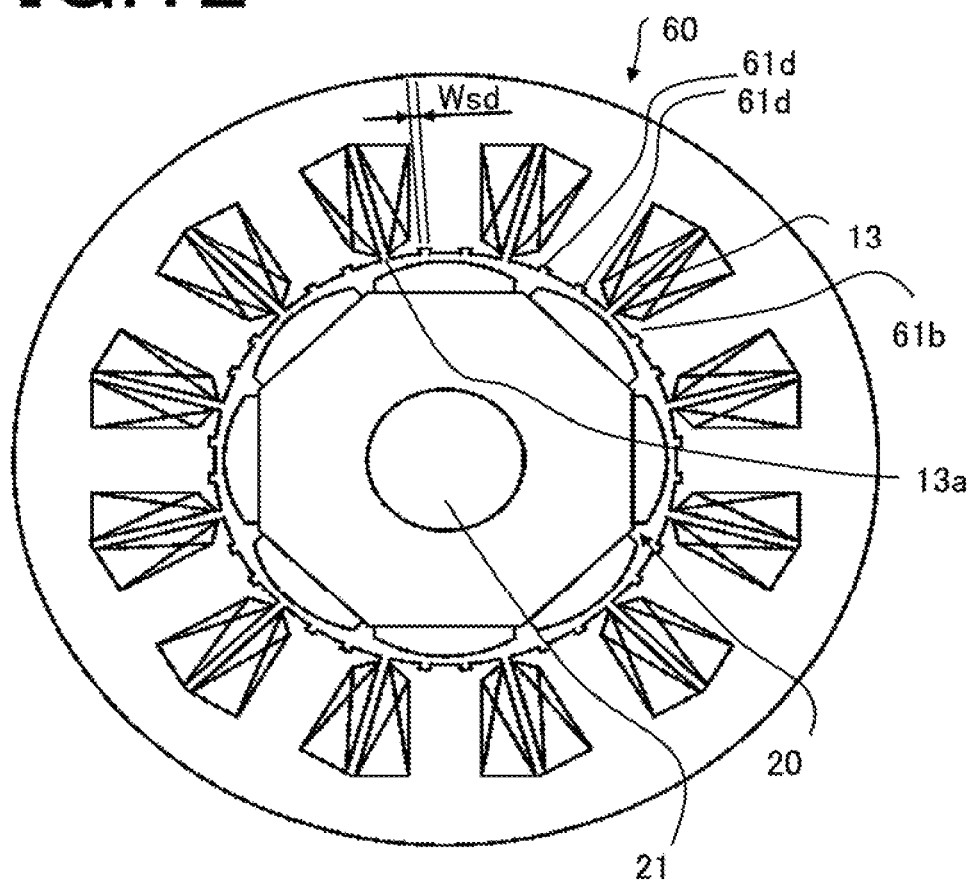
FIG. 12 is a cross-sectional view of an electric rotating machine according to Embodiment 2 perpendicular to its rotation shaft.

FIG. 12 is a cross-sectional view of an electric rotating machine 51 (not illustrated) according to Embodiment 2 perpendicular to its rotation shaft 21. On the head of each of tooth portions 61b of a stator 60, two dummy slots 61d are formed that are each a groove that is parallel to the axial direction and is recessed radially outward from the surface opposing the rotor 20. A width Wsd of the dummy slot 61d is almost the same in size as the width of the opening 13a of a slot 13. The slots 13 and the respective sets of the dummy slots 61s are arranged at almost the same intervals in the circumferential direction.

The difference of the electric rotating machine 51 according to Embodiment 2 from the electric rotating machine 1 according to Embodiment 1 only resides in that the dummy slots 61d are additionally provided on the head of the each of the tooth portions 61b of the stator 60. Description will be made on an electric power steering apparatus 110 (not illustrated) provided with the electric rotating machine 51.

As described previously, a cogging torque is generated due to fluctuation of a magnetic attractive force between the rotor 20 and the tooth portions 61b of the stator 60. According to the electric power steering apparatus 110, the lower the order component of the cogging torque, the larger the low-frequency component vibration sensible by the driver through the steering wheel at the time of steering. When the low-frequency component vibration becomes larger, the steering feeling is deteriorated.

Heretofore, an electric rotating machine 51 having 8 poles and 12 slots generates a cogging torque with peaks whose number is 24 that is the least common multiple in terms of the 12 slots 13 and 8 magnetic poles. However, in the electric rotating machine 51 according to Embodiment 2, since the dummy slots 61d are formed, the number of slots may be regarded virtually as 36.

Since the dummy slots 61d are formed, it becomes possible to cause a cogging torque to have peaks whose number is 72 that is the least common multiple. By thus increasing the order of the cogging torque, such an effect is obtained that it is possible to reduce the influence of the cogging torque to thereby improve the steering feeling.

It is noted that, in this Embodiment, the number of poles is 8 and the number of slots is 12; however, even in a case of having 2N magnetic poles and 3N tooth portions 61b, an effect of reducing the influence of the cogging torque is of course obtained (N denotes a natural number).

In conclusion, according to this Embodiment, with respect to the electric power steering apparatus 110 provided with the electric rotating machine 51 having 2N magnetic poles and 3N tooth portions 61b, it is possible to achieve reducing the operation noise and improving the steering feeling, at the same time. Accordingly, it is possible to apply the electric power steering apparatus 110 provided with the electric rotating machine 51 having 2N magnetic poles and 3N tooth portions 61b, to a vehicle which is required to have a low operation noise, such as, an EV, an HEV or the like (N denotes a natural number).

In this application, a variety of exemplary embodiments and examples are described; however, every characteristic, configuration or function that is described in one or more embodiments, is not limited to being applied to a specific embodiment, and may be applied singularly or in any of various combinations thereof to another embodiment. Accordingly, an infinite number of modified examples that are not exemplified here are supposed within the technical scope disclosed in the present description. For example, such cases shall be included where at least one configuration element is modified; where at least one configuration element is added or omitted; and furthermore, where at least one configuration element is extracted and combined with a configuration element of another embodiment.

DESCRIPTION OF REFERENCE NUMERALS 1, 51: electric rotating machine, 10, 60: stator, 11: stator iron core, 11a: annular portion, 11b, 61b: tooth portion, 11c: flange part, 12: armature winding, 13: slot, 13a: opening, 20: rotor, 20a, 20b: rotor block, 21: rotation shaft, 22: central body, 23: permanent magnet, 23a: magnet radially-outer surface, 23b: magnet radially-inner surface, 41: magnetic gap region, 61d: dummy slot, 100, 110: electric power steering apparatus.

What is claimed is:

1. An electric rotating machine which comprises: a stator; and a rotor located on a radially inner side of the stator,
    wherein the stator is provided with: an iron core having an annular portion and multiple tooth portions extending from the annular portion to its radially inner side and circumferentially arranged to be spaced apart from each other; and windings wound around the tooth portions;
    wherein the rotor is provided with multiple rotor blocks each having: a central body whose outer shape in cross-section perpendicular to its shaft center is a regular polygonal shape; and multiple permanent magnets placed on respective multiple flat portions of the central body corresponding to respective sides of the regular polygonal shape, said permanent magnets each having a cross-section perpendicular to the shaft center whose radially outer side is arc-like and whose radially inner side is linear;
    wherein the multiple rotor blocks are aligned in an axial direction while being shifted in a circumferential direction from each other by a preset angle, and are rotatable integrally;
    wherein the tooth portions are each provided with, at its head, flange parts circumferentially projecting toward heads of its adjacent tooth portions;
    wherein the permanent magnets each have, at its circumferential center, a maximum height from the flat portion;
    wherein the number of the tooth portions is 3N;
    wherein the shape of the central body is a 2N-sided polygonal shape;
    wherein the permanent magnets each have a minimum height near an end of the flat portion;
    wherein the rotor has two rotor blocks as said multiple rotor blocks;
    wherein said "N" denotes a natural number; and
    wherein, in order to reduce a torque ripple during rotation to 1% or less,
    a product of the angle and said "N", is set to be more than 25.2 and less than 40.0,
    a ratio of the minimum height of the permanent magnet to the maximum height of the permanent magnet is set to be more than 0.355 and less than 0.455; and
    a ratio of a flange-part root radial thickness at a root of the flange part to the maximum height of the permanent magnet is set to be less than 0.66.

2. The electric rotating machine of claim 1,
    wherein, in order to reduce the torque ripple during rotation to 0.5% or less, the ratio of the minimum height of the permanent magnet to the maximum height of the permanent magnet is set to be more than 0.37 and less than 0.43; and
    the ratio of the radial thickness to the maximum height of the permanent magnet is set to be less than 0.59.

3. The electric rotating machine of claim 1, wherein a rare earth magnet is used as the permanent magnet.

4. The electric rotating machine of claim 3, wherein a neodymium sintered magnet is used as the permanent magnet.

5. The electric rotating machine of claim 1, wherein a gap between adjacent ones of the respective flange parts is determined depending on a minimum gap between the rotor and the stator.

6. The electric rotating machine of claim 1, wherein, in order to reduce the torque ripple during rotation to 1% or less, a ratio of the gap between the adjacent flange parts to the minimum gap between the rotor and the stator is set to be more than 0.46.

7. The electric rotating machine of claim 6, wherein, in order to reduce the torque ripple during rotation to 0.5% or less, a gap between the adjacent flange parts is set to be more than two-thirds of the minimum gap between the rotor and the stator.

8. The electric rotating machine of claim 1, wherein, on a surface of the tooth portion opposing the rotor, a groove is formed that is parallel to the axial direction and is recessed radially outward.

9. The electric rotating machine of claim 8, wherein two grooves each being said groove are formed on the tooth portion.

10. An electric power steering apparatus, which comprises the electric rotating machine of claim 1.

* * * * *